US006809628B1

(12) United States Patent
Bensimon et al.

(10) Patent No.: US 6,809,628 B1
(45) Date of Patent: Oct. 26, 2004

(54) PERSONAL OR PERSONALIZABLE DEVICE FOR THE CONDITIONAL USE OF ELECTRIC OR ELECTRONIC APPLIANCES, METHOD OF USE

(76) Inventors: Aaron Bensimon, 5, Rue du Clos de l'Abbaye, 92160 Antony (FR); Armand Berneman, 11, Rue Crussol, 75011 Paris (FR); David Bensimon, 5, allee M. Chogall, 75013 Paris (FR); Danielle Berneman, 11, Rue Crussol, 75011 Paris (FR)

( * ) Notice: Subject to any disclaimer, the term of this patent is extended or adjusted under 35 U.S.C. 154(b) by 0 days.

(21) Appl. No.: 09/536,985

(22) Filed: Mar. 29, 2000

(30) Foreign Application Priority Data

Mar. 29, 1999 (FR) .......................................... 99 03862

(51) Int. Cl.7 .......................... G05B 19/00; G06F 7/00; G08B 29/00; H04B 1/00; H04L 9/32

(52) U.S. Cl. ...................... 340/5.6; 340/5.61; 340/5.23

(58) Field of Search ....................... 340/5.6, 5.61–5.67, 340/5.23, 5.24, 5.25, 5.22, 146, 149; 235/80

(56) References Cited

U.S. PATENT DOCUMENTS

| | | | | | |
|---|---|---|---|---|---|
| 3,629,834 | A | * | 12/1971 | Randall et al. | 235/382 |
| 3,821,704 | A | | 6/1974 | Sabsay | |
| 3,906,447 | A | | 9/1975 | Crafton | |
| 3,918,029 | A | * | 11/1975 | Lemelson | 235/472.03 |
| 4,404,464 | A | | 9/1983 | Moreno | |
| 4,742,351 | A | * | 5/1988 | Suzuki | 340/825.34 |
| 5,055,658 | A | * | 10/1991 | Cockburn | 235/382 |
| 5,204,663 | A | * | 4/1993 | Lee | 340/5.28 |
| 5,347,267 | A | * | 9/1994 | Murray | 340/5.24 |
| 5,373,146 | A | * | 12/1994 | Lei | 235/382.5 |
| 5,508,694 | A | * | 4/1996 | Treharne et al. | 340/5.24 |
| 5,748,737 | A | * | 5/1998 | Daggar | 380/24 |
| 5,836,010 | A | * | 11/1998 | Kim | 395/186 |
| 6,038,551 | A | * | 3/2000 | Barlow et al. | 705/41 |
| 6,268,788 | B1 | * | 7/2001 | Gray | 340/5.2 |

FOREIGN PATENT DOCUMENTS

| | | |
|---|---|---|
| EP | 0043270 | 1/1982 |
| EP | 0104284 | 4/1984 |
| EP | 0122244 | 10/1984 |
| EP | 0152678 | 8/1985 |
| EP | 0861524 | 9/1998 |
| FR | 2 715 748 | 8/1995 |
| GB | 2 126 647 | 3/1984 |
| JP | 8326375 | 12/1996 |
| WO | WO 9702200 | 1/1997 |

* cited by examiner

*Primary Examiner*—Michael Horabik
*Assistant Examiner*—Nam Nguyen
(74) *Attorney, Agent, or Firm*—Oblon, Spivak, McClelland, Maier & Neustadt, P.C.

(57) ABSTRACT

A device containing a personalizable substrate associated to a reader allowing the conditional operation of an electric or electronic appliance after comparison of the data with a memory by an identification and comparison circuit located on an essential part of said appliance and methods of using the device under conditional operation of electric or electronic appliances.

16 Claims, 5 Drawing Sheets

SWITCHES MEMORY

PERFORATED SUPPORT

PERSONAL OR PERSONALIZABLE DEVICE FOR THE CONDITIONAL USE OF ELECTRIC OR ELECTRONIC APPLIANCES, METHOD OF USE

BACKGROUND OF THE INVENTION

1. Field of the Invention

The present invention relates to a personal or personalizable device for the conditional use of electric or electronic appliances.

2. Discussion of the Background

Many electrical or electronic devices can be used without their usual users' agreement in absence of devices allowing the control of the start of their run in a sufficiently secured way. The codes usually installed on devices—such as TV sets or doors—are easily bypassed and require a growing memorization of numerical codes or the possession of multiple magnetic cards.

Numerous previous works allowed the development of devices aimed at increasing the security associated with access to premises, with bank operations, or with electronic keys of various applications. For example:

U.S. Pat. No. 3,821,704 (Sabsay) and U.S. Pat. No. 3,906,447 (Crafton) describe a security system for the control of access to premises. The device used puts in practice a key controlled by a decoding circuit comparing the data of a memory with those of the key. These patents do not give any description of a personalizable key, or the insertion of the decoding (identification and comparison) circuit in an essential site of an electric or electronic circuit of the appliance.

European patent application n° 43 270 concerns an unlocking system, in particular for the opening and closing of doors, by comparison of a code on a card with the content of a memory and the possibility of modifying the content of the memory.

European patent application No. 122 244 discloses a door locking-system consisting in a magnetic card, a reader of this card, a memory and a clock which allows the opening of the door if the content of the card and the memory agree during a lapse of time set by the clock.

British patent No. 2 126 647 describes an invention which allows to re-code an electronic locking system by using a master-key, in order to prevent the access to premises with a previous key.

European patent application No. 152 678 covers a locking system for hotel doors consisting in an electromagnetic system controlled by a microprocessor recognizing 5 levels of access, said system detects the code of a magnetic card inserted in an appropriate lock and allows the opening of the door.

French patent No. 2 715 748 [FR 9 401 202] concerns a system of automatic payment made secure by a card with a built-in chip.

U.S. Pat. No. 4,404,464 discloses an appliance for making an electrical contact with a portable electronic card, such as a card with a built-in chip.

Japanese patent No. J 08 326 375 describes a double security system for a door electronic key with a secret code to be typed on a key-pad and a recordable identification card compared with a memory.

PCT patent application No. 95 570 16 concerns the opening of a door with a card.

PCT patent application No. WO 97 02 200 (ERICSSON) describes a device comprising a signal generating unit that allows to identify which key of a keyboard is used.

European patent application No. 98 1042 84 (Olympus Optical Co.) discloses a procedure for the modulation of numerical data to send or record.

European patent No. 97 934 683 (Philips Electronics N.V.) describes an improved system of locking transmission.

On the other hand, to the inventors' knowledge, no previous document discloses the use of a key or personalizable substrate (or medium) for the control of the conditional operation of an electronic or electric appliance that uses an identification circuit localized on an essential electric or electronic part of said appliance.

By <<essential part>> one means any element which—if not active—will not allow the operation of the device. One means for example a printed or integrated circuit such as the mother-board or the micro-processor of a computer or the reception card of a TV or video recorder or the control circuit of household appliances, such as washing machine, fridge or photographic appliances or else machines controlled by electric circuits (such as all kinds of vehicles).

BRIEF SUMMARY OF THE INVENTION

The present invention relates to a device associated to an electric or electronic appliance consisting in one part of a personalized or personalizable substrate (key) and a reader of said substrate and on the other part of an electronic circuit of identification comprising a) a memory and b) a circuit comparing the memory content and the data read by the reader of the substrate (key), said identification circuit (electric or electronic) being placed on an essential electric or electronic circuit of the appliance.

(A) is a substrate personalizable by the presence or absence of modifications in this substrate. This substrate can be a key or a pocket size cardboard or plastic card, for example of the size of a credit or phone card.

(B) Is a reader of the said substrate consisting of an ensemble of electric or electronic circuits activated or de-activated by the introduction of the substrate in the reader.

(C) is a memory containing a comparison code.

(D) is an identification or comparison circuit (possibly on the same chip as the memory, as indicated by the dashed line) capable of reading the data of the reader and/or those of the memory and of activating, if the data of both sources are identical, one (or many) principal elements (such as BIOS, microprocessor, clock, demodulator, etc.) of an essential circuit of the appliance (such as mother board or printed circuit) on which is implanted the identification circuit (D) and/or the memory (C).

Figure 2:
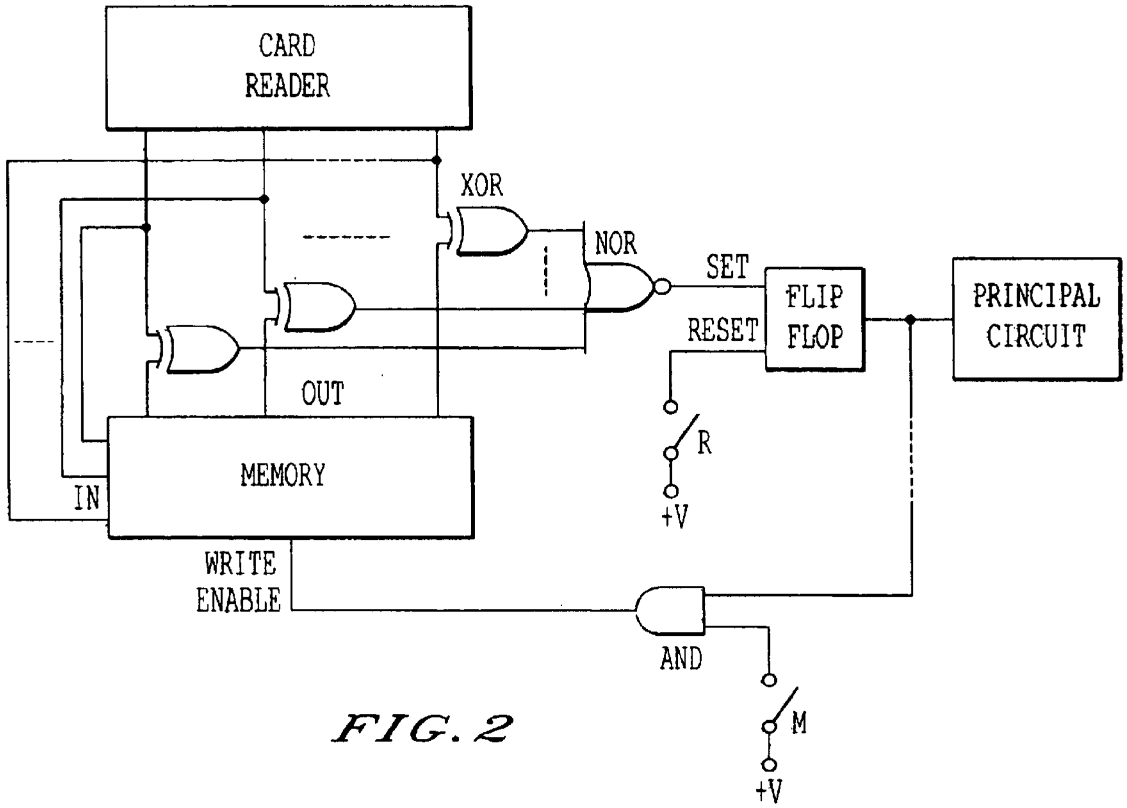

FIG. 2. Possible implementation of a SPEK or substrate. The output of the card reader and the memory are compared by the logical XOR gates (output tension '0' if both inputs are identical) which outputs are combined in a logical NOR gate (output tension '1' only if all inputs are '0'). The output of the logical NOR gate is used to set a flip-flop which controls the main circuit and possibly allows writing in the memory (type EEPROM, FLASH, etc.), in which case the memory is connected to the outputs of the card reader. Writing in the memory is done by introducing in the reader a new perforated card coded differently and validating writing by pushing on switch M (logical tension '1') which is one of the inputs to a logical AND gate (output tension '1' only if all inputs are '1'), the other input being the output of the flip-flop that controls the main circuit (logical tension '1' when the circuit is working).

Figure 3:
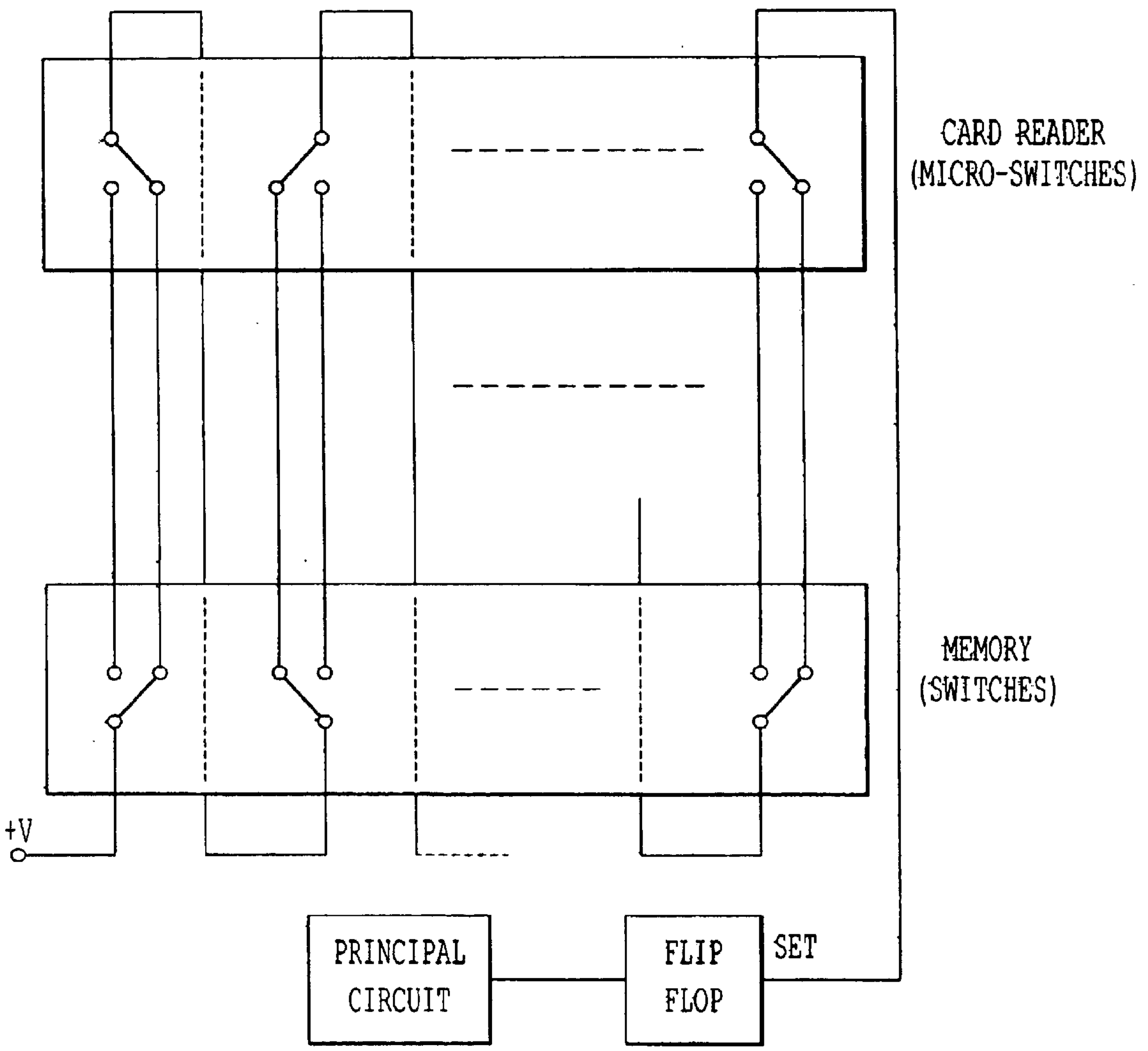

FIG. 3. Possible implementation of a SPEK by a system of micro-switches in the card reader and a system of switches as memory. When all gates are adequately connected the input tension +V ('1') sets a flip-flop that controls the main circuit and possibly the physical and/or visual access to the memory, in order to prevent its fraudulent modification.

Figure 4:
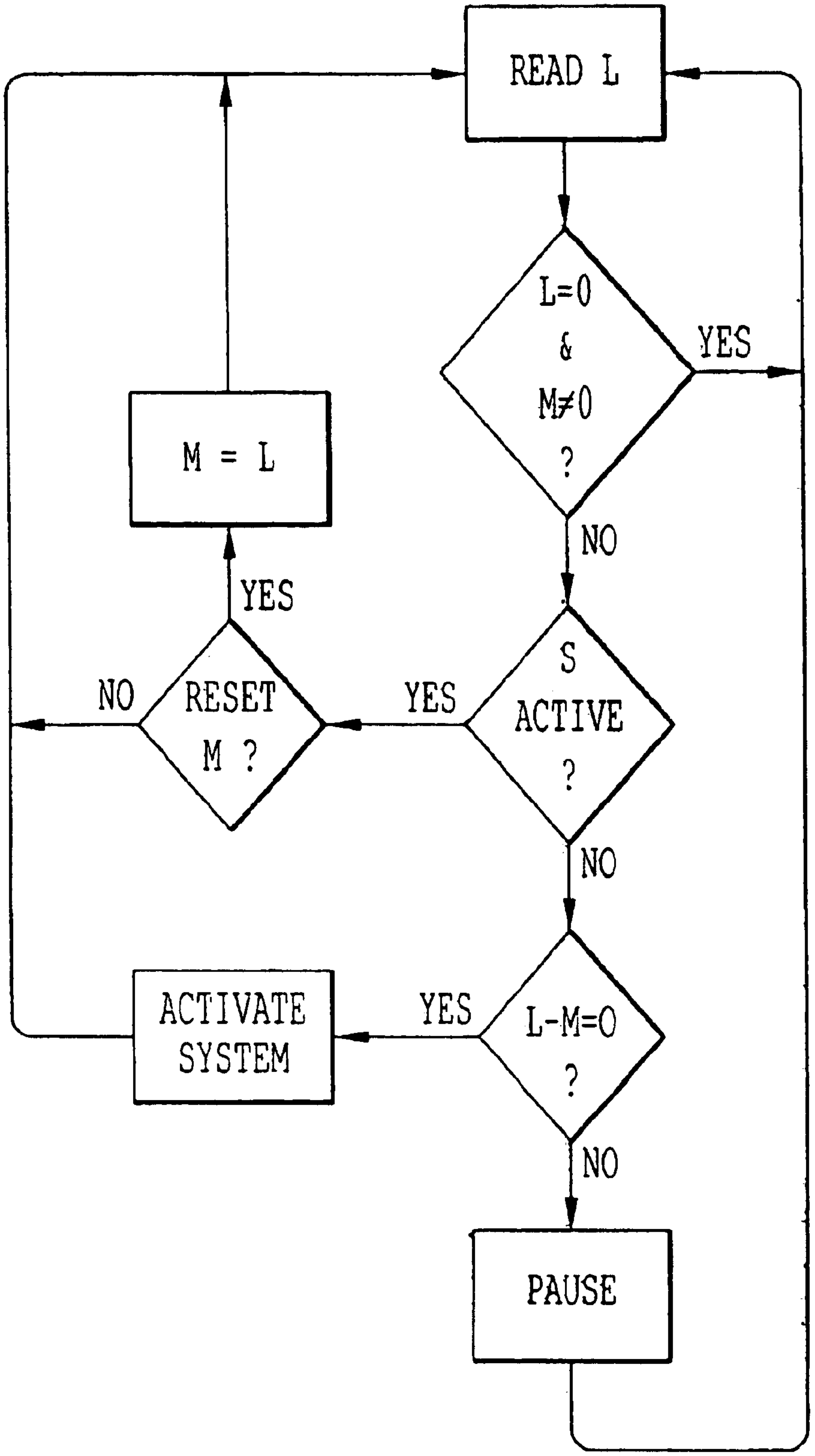

FIG. 4. Example of a program implemented on a micro-control chip comparing the output of reader L and memory M, activating system S or modifying the content of the memory if the system is already activated and if the user has pushed on the 'reset M' button.

Figure 5:
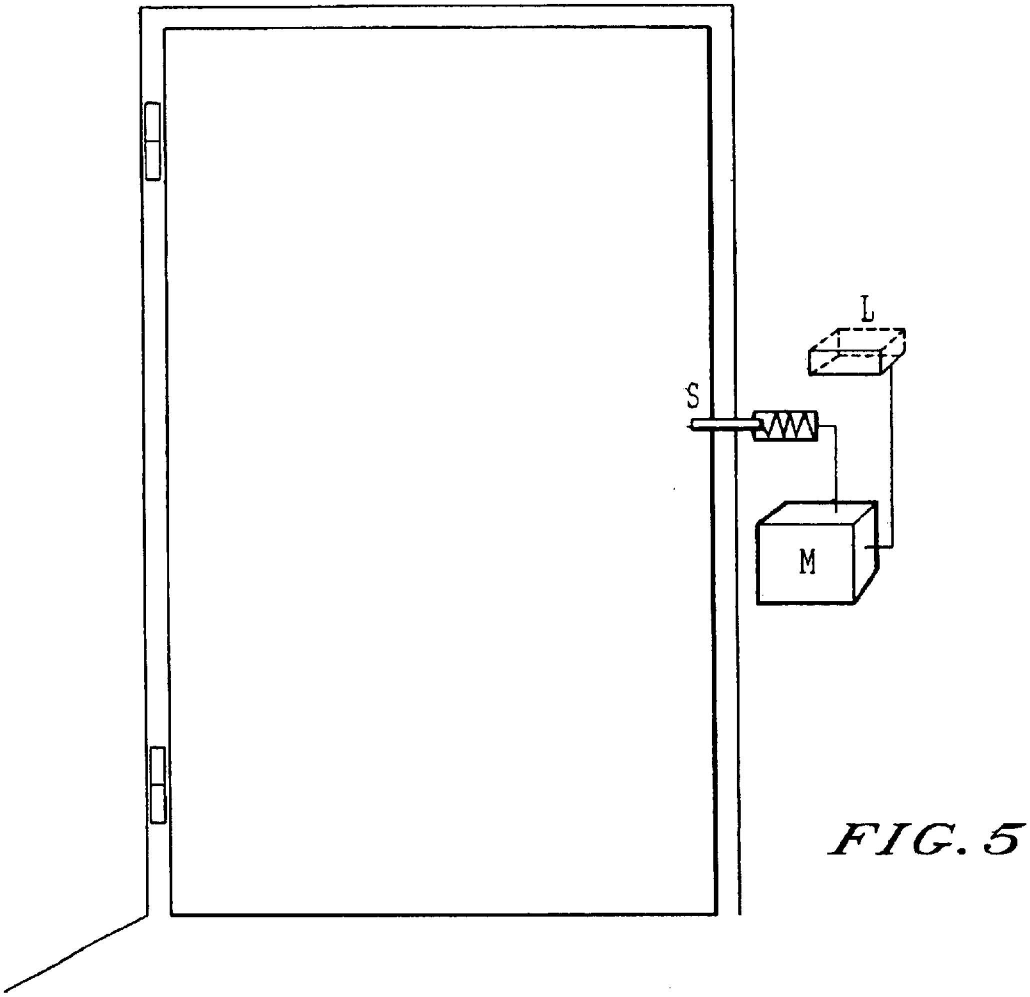

FIG. 5. Example of the use of a SPEK for the control of the opening of a door by the activation of a lock S, for example an electromagnetic type lock. The memory M might be a switch-type memory, (see FIG. 6), and comprises also an identification circuit such as described in FIG. 2. It is located inside the premises, which access the door controls. The reader L accepts perforated substrates, (see FIG. 7). It is located outside the premises.

Figure 6:
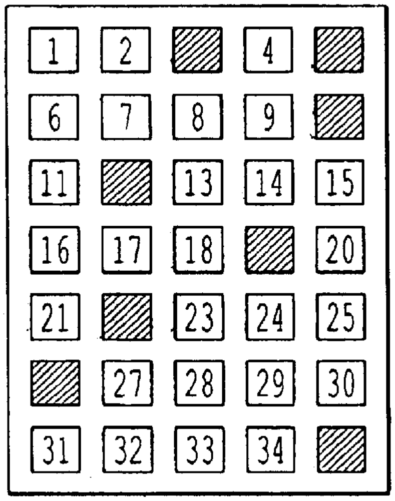

FIG. 6. Example of a switch memory that might be used in the system described in FIG. 5. The switches (push-button type) activated by the user (logical output '1') light up.

Figure 7:
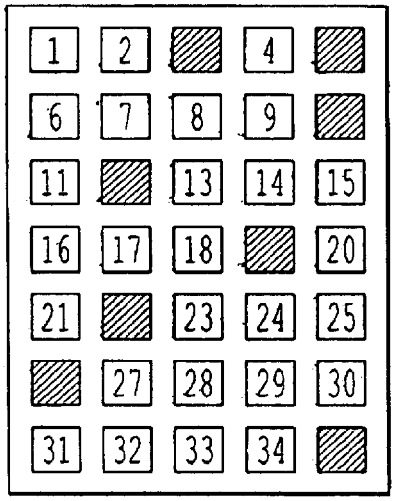

FIG. 7. Example of a perforated substrate that might be used in the system described in FIG. 5. The holes perforated in the card correspond to the switches lighted in the memory.

DETAILED DESCRIPTION OF THE INVENTION

By personalized or personalizable substrate or medium, one means a material element modifiable by the user and capable of receiving data recognized or recognizable by a device of reader type.

The present invention has for object to provide a procedure for the conditional operation of electronic or electric appliances that does not require the memorization of codes by the user through the use of a substrate easily personalizable and modifiable after every reactivation of the appliance, the said substrate being able to activate different appliances belonging to the same user. The same personalizable substrate can be used to secure many appliances of different types, for example TV-set, freezer or door of regulated access.

The invention concerns also appliances and devices containing the following elements or related to those (see FIG. 1):

A substrate (A) which is personalizable by the presence or absence of modifications in the said substrate. This substrate can be a key or a pocket-size card made of cardboard or plastic, for example the format of a credit or phone card or any other substrate capable of receiving data recognized by a reader (B).

A reader (B) of said substrate consisting of an ensemble of electric or electronic circuits activated or inactivated by the introduction of the substrate in the reader. The reader B can be placed inside or outside the appliance to be secured.

A memory (C) containing a comparison code.

An identification or comparison circuit (D) capable of reading the data of the reader and/or those of the memory and of activating the essential circuit of the appliance or a principal element if the data of both sources are identical.

The elements C and D are located inside the appliance on an electric or electronic circuit essential for the operation of the appliance. The elements C and D cannot be disconnected without impairing the operation of said appliance.

The invention covers a device associated to every electric or electronic appliance consisting, on one hand, in a personalized or personalizable substrate (key) and a reader of said substrate and, on the other hand, in an electronic identification circuit comprising a) a memory and b) a comparison circuit between the memory and the data read by the reader of the substrate (key), said identification circuit (electric or electronic) being placed on an essential electric or electronic circuit of the appliance (such as the motherboard of a computer or the printed circuit of an electric or electronic appliance, as a TV-set for example). This device may comprise an identification circuit to control the operation of the circuit or an essential part of the appliance by allowing it to be powered or by activating the microprocessor of the appliance or a logic chip.

The invention concerns every electric or electronic appliance containing or associating for its operation the device having the characteristics described above.

The invention also covers a method for the modification of the memory of the identification circuit consisting in introducing a first personalized or personalizable substrate in the reader (n° 1), putting the appliance under tension, then taking out the original substrate, then introducing a second substrate (n°2) aimed to replace the first substrate, the said second substrate having characteristics different of the first substrate and validate by activating or deactivating a circuit in order to replace the old data in memory by the new ones read by the reader. A variant of this procedure consists in first putting the appliance under tension then introducing the first substrate in the reader then proceeding as before. An other variant in order to modify the memory consists in introducing the personalizable substrate before the appliance is under tension, then after validation of the recognition of the authorized user by the identification and comparison circuit, to allow the modification of the memory by the user, for example by changing the position of micro-switches or push-buttons linked to the memory, by typing a code on a keyboard or by all other means allowing to modify the state or the content of the memory present in part C of the device according to the invention. It is understood that in this variant the user will have to modify the personalizable substrate in an adequate manner to have access to the appliance.

Figure 1:
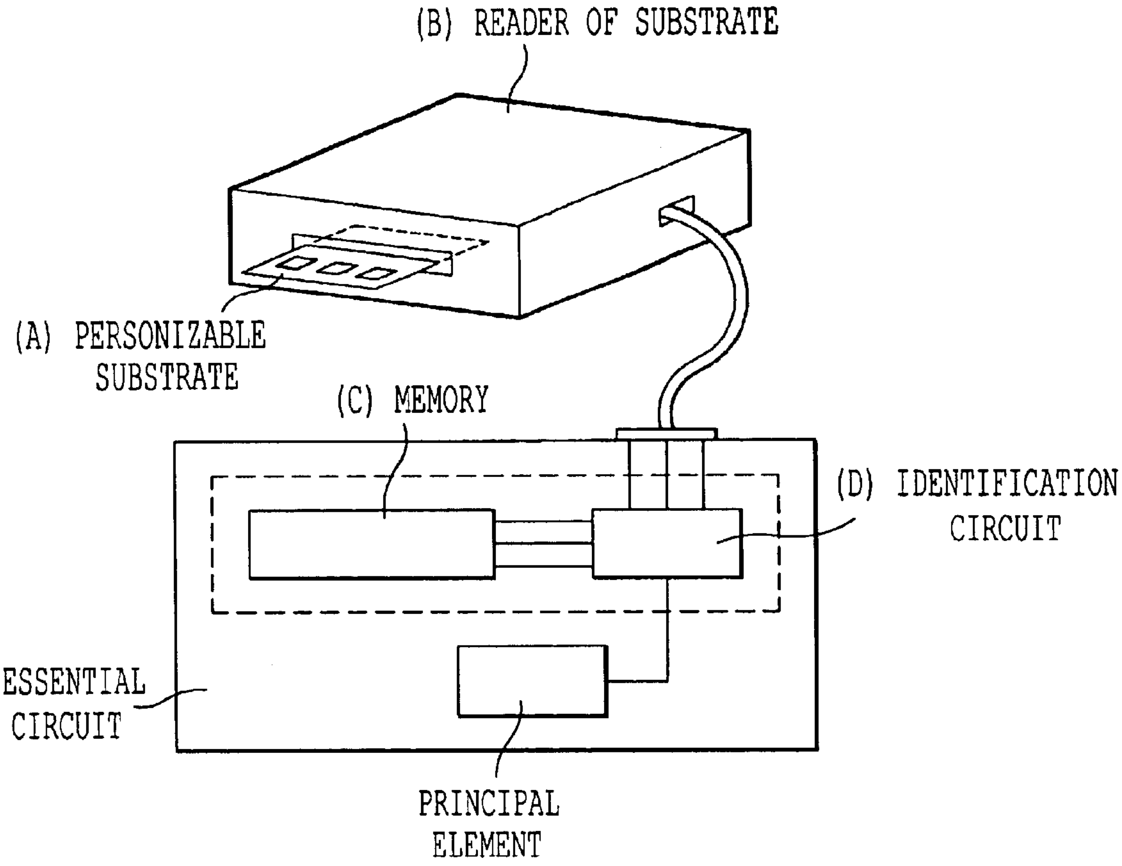
FIG. 1. Scheme of the device principle such as described in the invention.

A first implementation of a device for the starting of an appliance containing a part A and a part B is shown in FIG. 1, said device can be secured by a procedure of identification modifiable after every reactivation of the appliance.

In the device according to the invention, the substrate of part A is any element comprising a surface modifiable by the user such as to generate a code, said code allowing to obtain at least 1000 different combinations.

In the device according to the invention, the substrate is modifiable by perforating or scratching or coloring or erasing or gluing or ungluing or deforming part of its surface.

The invention also concerns a procedure of secured modification of the memory characterized on one hand by the introduction of the personalized or personalizable substrate in the reader, the identification of the user by the identification and comparison circuit and its validation by said circuit and on the other hand by the modification of the memory content by the user. In particular the modification of the: memory is done by removing the personalized or personalizable substrate from the reader and replacing it by an other substrate containing the new code and then validating the replacement of the memory content by this new code.

Finally, the invention covers a procedure of conditional operation of an electric or electronic appliance characterized by:

1) the putting in contact of a substrate equipped with a personal or personalizable code with a reader of this substrate reading said code.

2) the comparison of the data read by the reader with the content of a personal or personalizable memory, said comparison being done by a circuit located on an essential part of the electric or electronic circuit of the appliance.

Any power cut of the electric appliance generates the necessity to proceed to an operation of user recognition with the help of the personalized substrate by the memory and/or the comparison-identification circuit.

The device according to the present invention also called <<secured personal electronic key>> (SPEK) controls a main circuit or a critical electronic component in an appliance (such as computer, TV set, video, car-radio, electric door, contact circuit, etc.) and prevents their theft or fraudulent use. The same system can also allow the control of entrance and user identification in secured premises.

That system allows—thanks to a unique personalizable key—to control the operation of all the electrical appliances equipped with it. It also offers an absolute security against theft or fraudulent use, the number of possible combinations easily reaching $2^{100}=10^{30}$.

That system comprises notably:

A) A personalizable substrate or <<key>>

B) A reader of this substrate

C) A memory

D) An electronic identification circuit comparing the output of the reader and the memory and controlling a main circuit or a critical component (BIOS, memory, central unit, clock, oscillator, demodulator, electromagnetic switch, etc.) of the appliance in question.

The personalized or personalizable substrate has preferentially the format type of a credit card, or a similar one in which the user has (possibly himself) effected some modifications in specific places, the existence or not of modifications representing a code. Among the possible modifications of the substrate, one notices without restrictions: the perforation of holes in the card, the scratching (for example of a conducting or reflecting zone), the gluing or ungluing (for example in order to create a conducting or reflecting zone), the coloring (for example blackening) or the erasing of certain places on the substrate.

As an example, with the possibility to punch about thirty holes, the users disposes of a billion possible combinations ($2^{30}$).

The possibility for one-self to code his own key on standard and cheap cards (by perforation, scratching, gluing, ungluing, coloring or erasing) allows for the easy duplication of the keys and their quick modification if lost, without a security prejudice and with no need for specialized manpower (locksmith, electrician, etc.). A variant of the substrate might be constituted of two or more regions on the card, each corresponding to a particular code allowing the opening of a function or the access to certain appliances or premises.

The substrate reader is an ensemble of electric circuits activated or deactivated during the introduction of the key by the presence or absence of modifications in the substrate.

As examples one cites:

1) The presence or absence of perforations might or might not turn on a microswitch.

2) If the substrate is lighted on one side the existence of a hole might activate a photoelectric electric cell on the other side of the card.

3) If the substrate is conducting and powered when introduced in the reader, the existence or not of a contact between the reader and certain zones on the card (determined by perforation, scratching, gluing or ungluing of these zones on the substrate) can help to generate a tension at the output of the micro-switch.

4) If the surface of the substrate is reflecting, the existence of zones reflecting or not on the card (established by perforation, deformation, scratching, gluing, ungluing, erasing or adequate coloring) might, under illumination, be detected by photo-electric cells.

The output of the reader is an ensemble of logical tensions ('0' or '1') corresponding to the state of the electric circuits (such as micro-switches, micro-contacts, photo-electric cells, etc.) and reflecting the code of the key.

The memory is an electric circuit memorizing one (or many) particular state(s) of the reader of the substrate. It can possibly be protected when, without activation of the main circuit, the physical, visual or electric access to the memory and/or writing are unrealizable.

Among the electric circuits that can act as a memory, one mentions as examples:

A group of switches.

A permanent electronic memory such as

- an Electrically Erasable Programmable Read Only Memory (EEPROM) such as the memory NSC EEPROM 256 bits or more (catalogue FARNELL Components, USA),
- A FLASH memory (such as INTEL CMOS FLASH 256 Kbits (catalogue FARNELL),
- A non-volatile RAM memory (see catalogue FARNELL 1996).

The purpose of the electronic identification circuit is to compare the outputs of the substrate and the memory. It activates the main circuit—or a critical electronic component—under its control, when the outputs are identical. FIG. 1 illustrates an operating scheme for that circuit placed inside the appliance to be secured.

Depending on the circuit under control, that activation could be done in various ways: for example, by the activation of the functions set, reset, enable, etc. . . . , by the activation of an electromagnetic relay or by powering the main circuit.

Depending on the degree of security required, of complexity and cost, the electronic identification circuit can be either a microprocessor or a system of logical gates comparing the memory and reader outputs (see FIG. 2), or an ensemble of adequate connections between a switch-type memory and a micro-switch type reader (see FIG. 3).

One might advantageously use micro-control circuits (such as the 8 bits SGS microprocessors—ST626X, ARIZONA, PIC16C84, etc., (see catalogue FARNELL Components, USA)) that integrate on a single chip a microprocessor and an EEPROM (possibly also a data RAM and an EPROM memory) and can thus fulfill the double function of memory and identification circuit (see FIG. 1) and example 1 below.

For the implementation of the device, two options are present: either the key is left in the reader or it is taken out. If one wishes to take back the key after its introduction without turning off the appliance, the electrical circuit could set a flip-flop that will continue to activate the principal circuit or a critical component indefinitely (or for a determined time-lapse) even after the key has been retracted. In that case, one would possibly have to re-initialize the appliance (re-introduce the substrate, for example the card, turning it off or unplugging it for example) in order to re-secure it.

In a secured system, it might be desirable to prevent the access to the memory and/or the modification of its state without authorization. The authorization for the access to and the modification of the memory will preferentially be granted by the activation of the main circuit. When many users share the memory (multiple key system) the authorization of access to the memory can possibly be granted after activation of the main circuit by a competent authority (activation by the substrate or key of a <<privileged user>>).

In a preferred mode of implementation of the invention, the memory, of type permanent electronic memory (EEPROM, FLASH, etc.) cannot be modified but after activation of the main circuit. In other words, an agreement between the key card (or personalizable substrate) and the content of the memory must be established. The activation then permit writing in the memory, preferentially by the introduction of a new key card in the reader (and a possible complementary validation, by an adequate switch). In order to eliminate all possibilities of electronically breaking in the memory, in case of failure of identification, one can contemplate the introduction of a dead time (greater than one second for example and increasing with the number of failures) before a new identification attempt, (see FIG. 4) or a freezing of the identification system after a finite number of failures, for example after five attempts or a number of attempts corresponding to a really small probability of finding the right code by chance.

In an other mode of realization, the access to a memory of type <<switch ensemble>> might be physically blocked. This can be achieved, for example, with a key or a system of electromagnetic doors or shutters, freed by the activation of the main circuit and allowing the physical access to the memory (the switches).

Besides, if the state of the switches cannot be determined visually (push button type), the content of the memory might nevertheless be expressed by small LEDs which will light up, possibly after activation of the main circuit. That option allows to reflect the state of the associated switches and to manually modify them as desired.

In all these modes of realization, it thus becomes possible to operate various electrical appliances with a same and unique key, which code (for example the ensemble of perforations) is determined by the user and modifiable by himself, without the need of specialized manpower.

In an other mode of realization, the SPEK also allows the control of entrance and identification of the user. This can be achieved by coding (possibly in various places of the substrate) the identity of the user and the opening codes of the appliances and premises to which he is allowed. It is thus possible to use a SPEK in order to allow (or block) the access to certain determined TV channels, by a competent authority (a privileged user (super-user) such as the parents, for example).

Examples of the Implementation and Use of a SPEK (or Personalized or Personalizable Substrate)

Example 1

In a first implementation the outputs of the reader of a perforated substrate are connected by a ribbon cable to the entrance of a micro-controller (type SGS-ST626X) that compares these outputs with its memory M (type EEPROM), FIG. 1.

In this micro-controller the following program is implemented, see FIG. 4.

1) READ L: the microprocessor reads the content (outputs) of reader L.
2) If the content of reader L is null (L=0; there is no card in the reader) and if the content of the memory isn't null (M≠0; the memory has already been initialized) the program returns to (1).
3) If the preceding conditions are not satisfied, the program checks if the main circuit (system S) is already active or not.
4) If the system is not active the program checks if the contents of its memory and the reader are identical (L-M=0?). If yes, the system is activated. If not, the program after a certain time lapse (constant or increasing with every failure) returns to (1).
5) If the system is already active the program checks if the user wants to modify the memory content (reset button M). If yes, its content is replaced by that of the substrate reader, if not the program returns to (1).

The deactivation of the main circuit (and/or the micro-controller) can be done by shutting the power (turning off the appliance under control). The reactivation of the main circuit could then be done by turning on the appliance and inserting the perforated card, which can be done simultaneously.

Example 2

In a second implementation, the outputs of the substrate reader and the outputs of the memory (switch type) are compared one by one by XOR logical gates (logical output '0' if the inputs are identical, '1' if they are different). The outputs of the XOR gates are then combined in a NOR gate (logical output '1', if and only if all the entries are null). Thus the output of the NOR gate is '1', if and only if the contents of the memory and reader agree. The output of the NOR gate sets a flip-flop that activates the main circuit, even after removal of the card from its reader. That flip-flop can be reset such as to de-activate the main circuit by a switch R. Thus, if this circuit is used to activate an electromagnet that allows the opening of a door (see example 4), the closure of this door switches R and de-activates the opening circuit.

Example 3

In a third implementation, the reader is an ensemble of N micro-switches and the memory an ensemble of N switches. The output of memory switch j is connected to the entry of micro-switch j and the output of this micro-switch to the input of memory switch j+1, (see FIG. 3). Thus the flip-flop which activates the main circuit will be set only if there is a full agreement between the connections of the memory and the reader.

Example 4

Implementation of a SPEK for the control of a door opening.

The reader L (type ensemble of micro-switches) is embedded in the wall in such a way that its opening slit for a perforated substrate sticks out slightly, see FIG. 5. The output of the reader is connected by a ribbon cable to an identification and memory circuit (type ensemble of switches) M, as described in example 2. The location of the memory is arbitrary, but preferentially far from the reader (to prevent its access by breaking). The memory consists in a group of switches which light up if active (logical output '1'). Its access can be restrained by embedding it in a locked box. The perforated substrate is a card where the user has punched holes at places (numbered) corresponding to the lit switches of the memory, (see FIGS. 6 and 7). When this substrate is introduced in the reader, the identification circuit described in example 2, activates an electromagnetic lock, S which releases the door bolt. The door can be opened and when closed again, it turns on a switch which bolts it.

The invention presents many possibilities for adaptation by using elements similar to the ones described in the present application. The adaptations and variants which allow one to obtain the same effects as the device and the same implementation of the procedure are an integral part of the invention.

What is claimed is:

1. A system configured to control activation of an electrical appliance by a user, comprising:

a substrate on which an access code is encoded;

a substrate reader configured to read the access code encoded on the substrate; and a control circuit connected to a main circuit of the electrical appliance, the control circuit comprising:

a memory configured to store an activation code, and an identification circuit configured to activate the main circuit if the access code read by the substrate reader and the stored activation code are identical, wherein the access code encoded on the substrate is selectively modifiable by the user;

the activation code stored in the memory is modifiable by the user when the main circuit is activated; and the control circuit is configured to rewrite the memory if a validating input signal is received while a modified substrate, on which a new activation code is encoded, is present in the substrate reader.

2. The system of claim 1, wherein the substrate reader comprises photo-electric cells configured to detect light reflected from a surface of the substrate; and modifiable portions of the surface of the substrate are reflective under illumination.

3. The system of claim 1, wherein the substrate reader comprises photo-electric cells configured to detect light passing through selected openings on a first surface of the substrate, the light being emitted from a second surface of the substrate.

4. The system of claim 1, wherein:

the substrate is conducting and is powered when inserted into the substrate reader; and the substrate reader comprises microswitches configured to be activated by modifiable contact regions within the powered substrate.

5. The system of claim 1, wherein the memory comprises a plurality of switches, non-volatile RAM, flash memory, or an EEPROM.

6. The system of claim 1, wherein the substrate comprises a plastic card or a cardboard card.

7. The system of claim 1, wherein the control circuit is embedded on a circuit board of the electrical appliance.

8. The system of claim 1, wherein the identification circuit is configured to control the main circuit by allowing the main circuit to be powered.

9. The system of claim 1, wherein the substrate is configured to be modified such that at least 1000 different access codes can be encoded on the substrate.

10. The system of claim 9, wherein the substrate is configured to be modified by one of perforating, scratching, coloring, erasing, gluing, ungluing, and deforming a surface of the substrate.

11. A security device configured to control activation of an electrical appliance by a user, comprising:

a substrate reader configured to read an access code encoded on a substrate by the user; and a control circuit connected to a main circuit of the electrical appliance, the control circuit comprising:

a memory configured to store an activation code, and an identification circuit configured to activate the main circuit if the access code read by the substrate reader and the stored activation code are identical; wherein the access code encoded on the substrate is selectively modifiable by the user;

the activation code stored in the memory is modifiable by the user when the main circuit is activated; and the control circuit is configured to rewrite the memory if a validating input signal is received while a modified substrate, on which a new activation code is encoded, is present in the substrate reader.

12. The security device of claim 11, wherein the substrate is configured to be modified by one of perforating, scratching, coloring, erasing, gluing, ungluing, and deforming a surface of the substrate.

13. A method of modifying an activation code of a security device including a substrate reader configured to read an access code encoded on a substrate, and a control circuit connected to a main circuit of an electrical appliance, the control circuit including a memory configured to store an activation code and an identification circuit configured to control activation of the main circuit, the method comprising:

receiving a first substrate in the substrate reader and reading a first access code encoded on the first substrate by a user;

generating an activation signal if the identification circuit determines that the first access code read from the first substrate matches the activation code stored in the memory;

receiving a second substrate in the substrate reader, and if the activation signal was generated, reading a second access code encoded on the second substrate by the user;

rewriting the memory of the control circuit, if a validating input signal is generated by the user while the second substrate is present in the substrate reader, such that the second access code read from the substrate is stored as the activation code of the security device.

14. The method of claim 13, wherein the rewriting step comprises:

rewriting the memory if the validating input signal is received within a predetermined time after the generation of the activation signal.

15. The method of claim 13, wherein the validating input signal is generated by pushing a button located on the security device.

16. The method of claim 13, wherein the memory is configured to store only one activation code.

* * * * *